United States Patent
Kalotay

[15] 3,694,744
[45] Sept. 26, 1972

[54] PULSE FREQUENCY DETECTOR

[72] Inventor: Paul Zoltan Kalotay, Monterey Park, Calif.

[73] Assignee: International Telephone and Telegraph Corporation, New York, N.Y.

[22] Filed: Feb. 8, 1971

[21] Appl. No.: 113,172

Related U.S. Application Data

[62] Division of Ser. No. 871,914, Oct. 28, 1969, abandoned.

[52] U.S. Cl. ..............324/78 E, 307/233, 307/304, 324/126
[51] Int. Cl. ............................................G01r 23/02
[58] Field of Search ....324/78 E, 78 J; 307/304, 251, 307/233, 232; 328/140

[56] References Cited

UNITED STATES PATENTS 3,521,141   7/1970   Walton ..................307/304 X
3,521,081   7/1970   Vasseur et al. ............307/251

OTHER PUBLICATIONS

Kukla; Rev. Sci. Instr.; Vol. 38, No. 6; June, 1967; pp. 804–806.

*Primary Examiner*—Alfred E. Smith
*Attorney*—C. Cornell Remsen, Jr., Walter J. Baum, Paul W. Hemminger, Charles L. Johnson, Jr. and Thomas E. Kristofferson

[57] ABSTRACT

A circuit for use with a milliammeter or the like calibrated in pulse repetition frequency (PRF). An averaging circuit receives pulses at the PRF to be indicated. The averaging circuit includes a first capacitor which is charged. A substantially isolated second capacitor provides an output through a source follower. A switch connects the capacitors to allow the charge of the first capacitor to be sampled. The switch is closed at the same frequency as the PRF to be indicated. A second source follower has a constant bias. The milliammeter is then connected between the source electrodes of the source followers.

6 Claims, 2 Drawing Figures

Inventor
P. Z. KALOTAY

By *J. Donald Stolz*
Attorney

PULSE FREQUENCY DETECTOR

BACKGROUND OF THE INVENTION

This application is a division of copending application Ser. No. 871,914 filed Oct. 28, 1969, and now abandoned for PULSE FREQUENCY DETECTOR. The benefit of the filing date of said copending application is, therefore, claimed for this application.

This invention relates to electrical instruments or the like, and more particularly, to a device for producing an output signal directly proportional to pulse repetition frequency (PRF) and an output circuit which may be used therewith or with other inputs.

In the past, it has been the practice to generate pulses at a particular frequency and average the pulses. The average is thus proportional to the PRF. However, if the average is impressed upon a meter when the PRF is very low, the meter needle will jump with each pulse and will not steadily indicate the accurate PRF.

SUMMARY OF THE INVENTION

In accordance with the device of the present invention, the above-described and other disadvantages of the prior art are overcome by providing an isolated capacitor in addition to an averaging capacitor with a switch between to sample the capacitor charge. The isolated capacitor is thus able to hold its charge for long periods of time, and very low PRF's may be measured. For example, a PRF of two pulses per minute or per a substantially longer unit of time may be measured.

Another feature of the invention resides in the use of a high input impedance-low output impedance, balanced output circuit. High accuracy and good capacitor isolation is achieved. Junction field-effect transistors of the N-channel type are used for this purpose. The output circuit also provides temperature compensation.

The above-described and other advantages of the invention will be better understood from the following description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
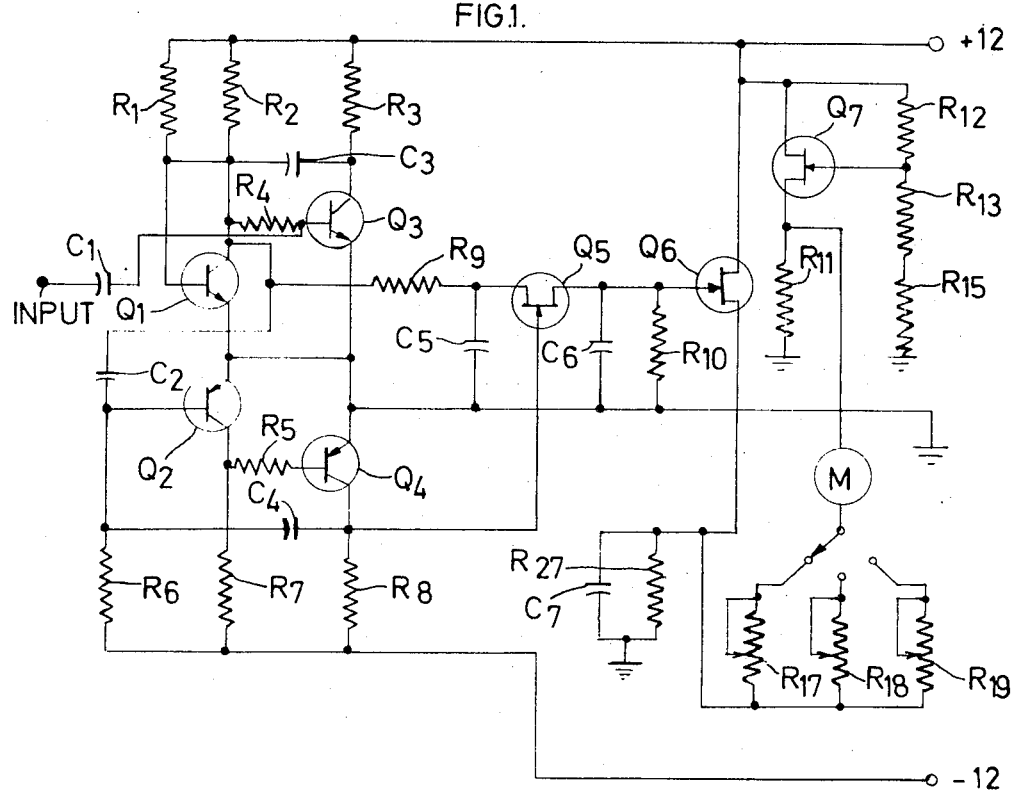
FIG. 1 is a schematic diagram of one embodiment of the present invention.

In FIG. 1, Q1, Q3, R1, R2, R3, R4 and C3 are the parts of a monostable multivibrator which converts different duty cycle input pulse trains into a pulse train with uniform pulse width and amplitude. The same applies to Q2, Q4, R5, R6, R7, R8 and C4, with the exception of different width and polarity. An input capacitor C1 is provided. Transistors Q1 and Q3 act as part of a monostable multivibrator circuit supply input pulses to charge a capacitor C5 through a resistor R9. Transistors Q2 and Q4 act as part of a second monostable multivibrator circuit which supplies pulses to the gate of junction type, field-effect transistor Q5. Field-effect transistors Q6 and Q7 are identical to field-effect transistor Q5. All three transistors Q5, Q6 and Q7 are of the N-channel type.

Capacitor C1 receives a train of input pulses, the frequency of which is to be indicated. Capacitor C1 is connected to the base of transistor Q1. Resistor R1 is connected from a DC source of potential to the base of transistor Q1. A resistor R2 is connected from the potential source to the collector of transistor Q1. Resistor R3 is connected from the potential source to the collector of transistor Q3. The collector of transistor Q3 is connected to the base of transistor Q1 by capacitor C3. The collector of transistor Q1 is connected to the base of transistor Q3 by a resistor R4. The collector of transistor Q1 is connected to the drain of transistor Q5 by resistor R9. Note will be taken that, in relation to all three transistors Q5, Q6 and Q7, the sources and drains are identical and are thereby interchangeable. The collector of transistor Q1 is connected to the base of transistor Q2 by a capacitor C2.

The emitter of transistor Q3 is grounded. The same is true of one side of capacitor C5, one side of capacitor C6 and one side of resistor R10. The other side of capacitor C5 is connected to the drain of transistor Q5. The other sides of capacitor C6 and resistor R10 are connected to the source of transistor Q5. The source of transistor Q5 is connected to the gate of transistor Q6. The emitters of transistors Q2 and Q4 are connected together. The collector of transistor Q2 is connected to the base of transistor Q4 by a resistor R5. The base of transistor Q2 is connected to the collector of transistor Q4 by a capacitor C4. Resistors R6, R7 and R8 are connected to transistor Q2. Resistor R7 is connected to the collector of transistor Q2. Resistor R8 is connected to the collector of transistor Q4.

The drain of transistor Q6 is connected to the positive source of potential. The drain of transistor Q7 is also likewise connected. The source of transistor Q6 is connected to ground through a resistor R27. A capacitor C7 is connected in parallel with resistor R27. Resistors R12, R13 and R15 are connected in series from the positive source of potential to ground. The junction between resistors R12 and R13 is connected to the gate of transistor Q7. A resistor R11 is connected from the source of transistor Q7 to ground.

Three variable resistors R17, R18 and R19 are connected from the source of transistor Q6 to three contacts, respectively, on the switch. The switch has a pole. A meter M is connected from the switch pole to the source of transistor Q7.

Capacitor C1 acts as a coupling capacitor to the first multivibrator. Capacitors C3 and C4 act as the multivibrator capacitors. Capacitor C2 acts as a coupling capacitor from the first multivibrator to the second multivibrator.

Resistor R9 and capacitor C5 act as an averaging circuit to the output pulses of the first multivibrator.

Transistor Q5 acts as a switch to allow capacitor C6 to discharge into capacitor C5 or vice versa.

Capacitor C6 holds its charge for long periods of time because it is substantially isolated. The source-to-drain and drain-to-source impedance of transistor Q5 is extremely high. The input impedance of transistor C6 is likewise extremely high. Thus, once capacitor C6 has received its charge, it cannot discharge rapidly. The resistance of resistor R10 is also quite high. Resistor R10 may be omitted, if desired. However, the holding period of capacitor C6 is so high, resistor R10 may often be desired so that meter M will show a PRF of zero within a short time if the PRF of the input pulses goes to zero.

Q6 is connected in a source follower circuit. The same is true of Q7. The two source follower circuits are identical except that Q6 receives a variable input signal and Q7 receives a constant input signal set by R12, R13 and R15.

Capacitor C7 smooths the output of transistor Q6. Resistors R17, R18 and R19 are simply range adjustments for meter M. The switch is simply a range selector switch. Meter M may be a milliammeter calibrated in pulse repetition frequency.

Figure 2:
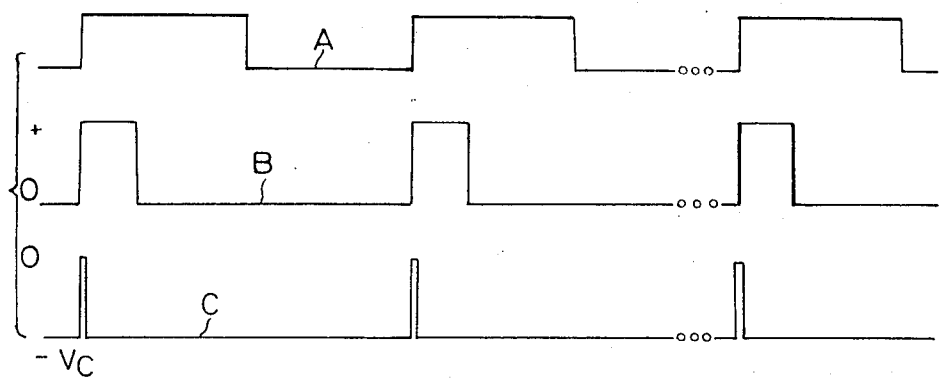
FIG. 2 is a graph of a group of waveforms characteristic of the operation of the invention.

The input signal to capacitor C1 may have the form A shown in FIG. 2. The potential of the collector of transistor Q1 may vary as indicated at B in FIG. 2.

The potential of the collector of transistor Q4 may vary as indicated at C in FIG. 2.

In the operation of the circuit shown in FIG. 1, capacitor C1 receives a series of input pulses at a certain repetition frequency. Pulses B are then employed to charge capacitor C5 through resistor R9. Note will be taken that the monostable multivibrator including transistors Q1 and Q3 produces output pulses which have leading edges coincident with the leading edges of the pulses at A but have trailing edges which do not coincide with the trailing edges of the pulses at A. For a short time during the initial portion of each pulse B, capacitor C6 is allowed to charge or discharge from capacitor C5. The time that the switch is closed and transistor Q5 conducts is the time width of pulses C. The charge of capacitor C6 is read on meter M.

There is one outstanding advantage of the present invention in that capacitor C6 holds its charge for long periods of time. This is because it is isolated by transistors Q5 and Q6. As a result, it is possible to measure low pulse repetition frequency.

It is also an advantage of the invention that the source follower circuit transistors Q6 and Q7 match each other and provide a minimum current drain on capacitor C6. The fact that the source followers will match also increases the accuracy of measurement. Still further, by using the same circuit components, temperature compensation is achieved; and supply voltage changes have no effect on operation.

What is claimed is:

1. Apparatus for producing an output in accordance with the repetition frequency of a plurality of pulses, said apparatus comprising: a first capacitor; first means for impressing voltage pulses across said first capacitor; a second capacitor; a switch connected between said capacitors; second means to close said switch periodically; said first means including a first monostable multivibrator responsive to the leading edges of input pulses thereto, one side of each capacitor being connected to a point of reference potential, a first resistor connected from said first multivibrator to the other side of said first capacitor, said switch including a first junction type, field-effect transistor having a source, a drain, and a gate, said first transistor source being connected to the other side of said first transistor, said second means including a second monostable multivibrator adapted to turn said switch on over an initial portion of the period that said first multivibrator tends to charge said first capacitor, a second resistor connected in parallel with said second capacitor, second and third junction type, field-effect transistors each having a source, a drain, and a gate, said second and third transistors being connected as source followers, third and fourth resistors connected from the sources of said second and third transistors, respectively, a third capacitor connected in parallel with said third resistor, means to supply a constant bias to said third transistor gate, the other side of said second capacitor being connected to said second transistor gate, a single-pole multiple-throw switch, a contact for each throw, a variable resistor connected from each contact to the source of one of said second and third transistors, and an electric current meter connected from the pole of said single-pole switch to the source of the other of said second and third transistors.

2. An isolation circuit comprising: first and second variable impedance devices, each device having a control electrode, and first and second main electrodes, said first electrodes being connected together; first and second resistors connected, respectively, from said second electrodes to a point of reference potential; first means for maintaining one of said control electrodes at a constant potential; and second means connected between said second electrodes responsive to the difference in potential therebetween.

3. The invention as defined in claim 2, wherein said devices are junction type, field-effect transistors, said control electrodes being gates, said first electrodes being drains, said second electrodes being sources.

4. The invention as defined in claim 3, wherein said second means is an electric current indicating instrument.

5. The invention as defined in claim 2, wherein said second means is an electric current indicating instrument.

6. Apparatus for producing an output in accordance with the repetition frequency of a plurality of pulses, said apparatus comprising: a first capacitor; first means for impressing voltage pulses across said first capacitor; a second capacitor; a switch connected between said capacitors; second means to close said switch periodically; first and second source followers each having a gate and a source, one side of said capacitors being connected to a point of reference potential, the other sides of said capacitors being connected on opposite sides of said switch, the other side of said second capacitor being connected to the gate of said first follower source, means to supply a constant voltage to the gate of said second follower, and an electric current indicator connected between said sources.

* * * * *